US009071141B2

(12) United States Patent
Dong et al.

(10) Patent No.: US 9,071,141 B2
(45) Date of Patent: Jun. 30, 2015

(54) TWO-STAGE SINGLE PHASE BI-DIRECTIONAL PWM POWER CONVERTER WITH DC LINK CAPACITOR REDUCTION

(75) Inventors: Dong Dong, Blacksburg, VA (US); Dushan Boroyevich, Blacksburg, VA (US); Ruxi Wang, Blacksburg, VA (US); Fred Wang, Knoxville, TN (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 281 days.

(21) Appl. No.: 13/441,246

(22) Filed: Apr. 6, 2012

(65) Prior Publication Data

US 2012/0257429 A1 Oct. 11, 2012

Related U.S. Application Data

(60) Provisional application No. 61/473,399, filed on Apr. 8, 2011.

(51) Int. Cl.

| | |
|---|---|
| ***H02M 7/797*** | (2006.01) |
| ***H02M 3/158*** | (2006.01) |
| ***H02M 7/48*** | (2007.01) |
| *H02J 1/10* | (2006.01) |
| *H02J 3/32* | (2006.01) |
| *H02M 1/00* | (2007.01) |
| *H02J 3/38* | (2006.01) |

(52) U.S. Cl.

CPC ............ *H02M 3/1582* (2013.01); *H02M 7/797* (2013.01); *H02J 1/10* (2013.01); *H02J 3/32* (2013.01); *H02M 7/48* (2013.01); *H02M 2001/007* (2013.01); *Y02B 70/1425* (2013.01); *H02J 3/383* (2013.01); *H02J 3/386* (2013.01); *Y02E 10/563* (2013.01); *Y02E 10/566* (2013.01); *Y02E 10/763* (2013.01)

(58) Field of Classification Search

CPC .. H02M 1/15; H02M 2001/007; H02M 7/797

USPC ............................................................ 363/65

See application file for complete search history.

(56) References Cited

U.S. PATENT DOCUMENTS

| | | | | |
|---|---|---|---|---|
| 6,320,775 | B1 * | 11/2001 | Ito et al. | 363/132 |
| 7,450,401 | B2 * | 11/2008 | Iida | 363/16 |
| 8,089,785 | B2 * | 1/2012 | Rodriguez | 363/35 |
| 2005/0226017 | A1 * | 10/2005 | Kotsopoulos et al. | 363/125 |
| 2007/0080659 | A1 * | 4/2007 | Urakabe et al. | 318/599 |
| 2008/0062724 | A1 * | 3/2008 | Feng et al. | 363/17 |
| 2009/0116266 | A1 * | 5/2009 | Lai et al. | 363/40 |
| 2010/0136379 | A1 * | 6/2010 | King et al. | 429/23 |
| 2011/0026281 | A1 * | 2/2011 | Chapman et al. | 363/65 |
| 2012/0049772 | A1 * | 3/2012 | Moussaoui et al. | 318/376 |

* cited by examiner

*Primary Examiner* — Harry Behm

(74) *Attorney, Agent, or Firm* — Whitham Curtis Christofferson & Cook, PC

(57) ABSTRACT

DC link capacitance in a bi-directional AC/DC power converter using a full-bridge or H-bridge switching circuit can be greatly reduced and the power density of the power converter correspondingly increased by inclusion of a bi-directional synchronous rectifier (SR) DC/DC converter as a second stage of the power converter and controlling the second stage with a control loop having a transfer function common to both buck and boost modes of operation of the bi-directional SR DC/DC converter and a resonant transfer function to increase gain at the ripple voltage frequency (twice the AC line frequency) to control the duty cycle of the switches of the bi-directional SR DC/DC stage and controlling the duty cycle of the switches of the full-bridge or H-bridge switching circuit using a control loop including a notch filter at the ripple voltage frequency.

12 Claims, 13 Drawing Sheets

Table II Main volume comparison between two-stage topology and full-bridge

| $fs$ | 20kHz | |
|---|---|---|
| Topology | Full-bridge | Two-stage |
| $V_{av}$ | $V_{av} = V_o = 380$ V | $V_{av} = 550$ V |
| Dc bus voltage $V_o$ ripple | 10 V pp | |
| $C_{dc}$ (Volume) | 6.9 mF (10.54 Liter) | 250 μF (0.63 Liter) |
| $L_{ac1}$(Volume) | 161.2 μH (0.2 Liter) | 233.3 μH (0.23 Liter) |
| $L_{ac2}$(Volume) | 24.8 μH (0.04 Liter) | 24.5 μH (0.04 Liter) |
| $C_{DM}$(Volume) | 10 μF (0.03 Liter) | 10 μF (0.03 Liter) |
| $C_o$(Volume) | 0 μF (0 Liter) | 100 μF (0.1 Liter) |
| $L_o$(Volume) | 0 μH (0 Liter) | 200 μH (0.15 Liter) |
| Heatsink Volume | 0.41 Liter | 0.75 Liter |
| Efficiency | 95.1% | 93.0% |
| Total Volume | 11.22 Liter | 1.93 Liter |

*Figure 18*

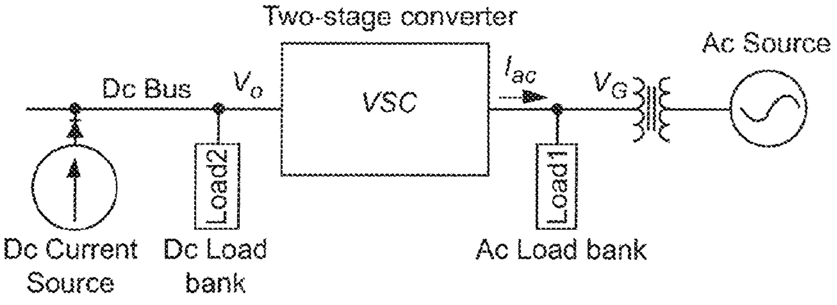

*Figure 19*

TWO-STAGE SINGLE PHASE BI-DIRECTIONAL PWM POWER CONVERTER WITH DC LINK CAPACITOR REDUCTION

CROSS-REFERENCE TO RELATED APPLICATIONS

This application claims benefit of priority of U.S. Provisional Application 61/473,399, filed Apr. 8, 2011, which is hereby incorporated by reference in its entirety.

FIELD OF THE INVENTION

The present invention generally relates to Power supplies and power converters and, more particularly, to bi-directional AC/DC power converters which are particularly useful for interfacing a DC based distribution system and/or renewable energy sources to an AC power distribution grid.

BACKGROUND OF THE INVENTION

At the present time, most electrical power is generated by relatively large power plants operating on fossil or nuclear fuels or hydroelectric power plants for which relatively few suitable locations exist naturally or can be developed. The distribution of such facilities and the variations in demand for power in different geographic regions requires distribution of generated alternating current (AC) power over a network of power transmission lines referred to as a grid. The voltage at which AC power is distributed is generally chosen in accordance with the length of various links since more power can be transmitted at higher voltages and lower currents with reduced losses for a given cross-sectional size of conductor. Lower voltages for shorter links can be readily develop from high voltage AC power through use of transformers.

In recent years, however, there has been great interest in so-called renewable energy and power sources such as solar power and wind power. In the case of solar power, in particular, the power is generated as a substantially constant direct current (DC) voltage from an array of photovoltaic cells, when in operation. In the case of wind power, while wind turbines can be designed to general AC power, their speed and hence the frequency of the alternating voltage produced is subject to wide variation and thus very difficult to synchronize with a power distribution grid. Therefore, wind turbines are generally designed to deliver DC power as well.

It is also characteristic of renewable energy sources that power cannot be continuously generated. Therefore, some facility for energy storage is generally provided, usually as batteries in which energy is stored through a reversible chemical reaction. For that reason, such energy is input into and recovered from such batteries as DC power.

Many solar and wind power generation installations are built without having any local loads and are designed to deliver power only to the power distribution grid. In these types of installations only a suitable inverter device (e.g. a unidirectional Dc to AC power converter) is necessary to develop and synchronize AC power for delivery to the power distribution grid. Other installations may be built for a local load such as for a residence and may or may not be connected to deliver excess power to the power distribution grid or to obtain power from the grid when local renewable resource power generation and (locally stored power, if available) is insufficient for the loads that may be present at a given time. Between these types of installation, some renewable resource power generation systems are developed as so-called nanogrids where there may be numerous types of loads and where power can be input to the nanogrid from the power distribution grid and excess locally generated power can be output to the grid. In these latter types of renewable resource power generation system, a bi-directional power converter capable of delivering power either to or from the grid is required.

So-called full bridge or H-bridge power converters have drawn interest as both inverters and possible bi-directional operation. However, when such a circuit is used in a rectification mode for delivery of power from the grid as DC power, a very large capacitor is required for the DC output, referred to as the DC link, in order to adequately suppress voltage ripple. Unless the ripple is adequately suppressed large electrical stresses are placed on devices connected to the DC link which may cause premature aging of components and photovoltaic cells in particular. However such large capacitances must be of electrolytic design and thus are of large volume, which reduces the converter power density, and subject to failure.

SUMMARY OF THE INVENTION

It is therefore an object of the present invention to provide a two-stage AC/DC bi-directional converter topology having improved power density through reduction in DC link capacitance and low DC ripple voltage with close voltage regulation while capable of rapid transient load response.

It is another object of the present invention to provide an AC/DC bidirectional power converter topology to greatly reduce the required DC link capacitance of the power converter while meeting output DC voltage and AC current regulation requirements.

It is a further object of the invention to provide an AC/DC bi-directional power converter that attains particularly high performance through digital controls.

It is further object of the invention to provide bi-directional AC/DC power conversion with a consistent switching methodology for either power transfer direction and which includes bi-directional current interruption capability for over-current protection.

In order to accomplish these and other objects of the invention, a single-phase bi-directional AC/DC power converter is provided having a DC side and an AC side, comprising a full-bridge switching circuit connected between an AC source or load and a DC link, a DC link capacitor, and a bi-directional synchronous rectifier DC/DC power converter receiving or delivering power from or to the DC link as well as providing DC voltage regulation in one direction of power transfer and an increased DC voltage in another direction of power transfer whereby capacitance of said DC link capacitor can be reduced while limiting voltage variation at an output of said DC/DC power converter. The output of a second stage DC/DC converter maintains small DC voltage ripple allowing dramatic reduction in the DC link capacitance and overall volume reduction of the power converter.

In accordance with another aspect of the invention, a method of reducing DC link capacitance of a bi-directional AC/DC power converter having an AC side and a DC side comprising steps of regulating voltage of power supplied from the DC link with a predetermined tolerance, determining maximum and minimum tolerable voltages on the DC link at a predetermined average voltage on the DC link, and determining a minimum capacitance value required to limit maximum and minimum DC link voltages within the maximum and minimum tolerable voltages.

BRIEF DESCRIPTION OF THE DRAWINGS

The foregoing and other objects, aspects and advantages will be better understood from the following detailed description of a preferred embodiment of the invention with reference to the drawings, in which:

FIG. 18 illustrates a volume comparison of the invention with a full bridge converter of conventional design, FIG. 19 is a schematic illustration of a generalized exemplary application of the invention, and test circuit verifying bi-directional operation.

DETAILED DESCRIPTION OF A PREFERRED EMBODIMENT OF THE INVENTION

Figure 1:
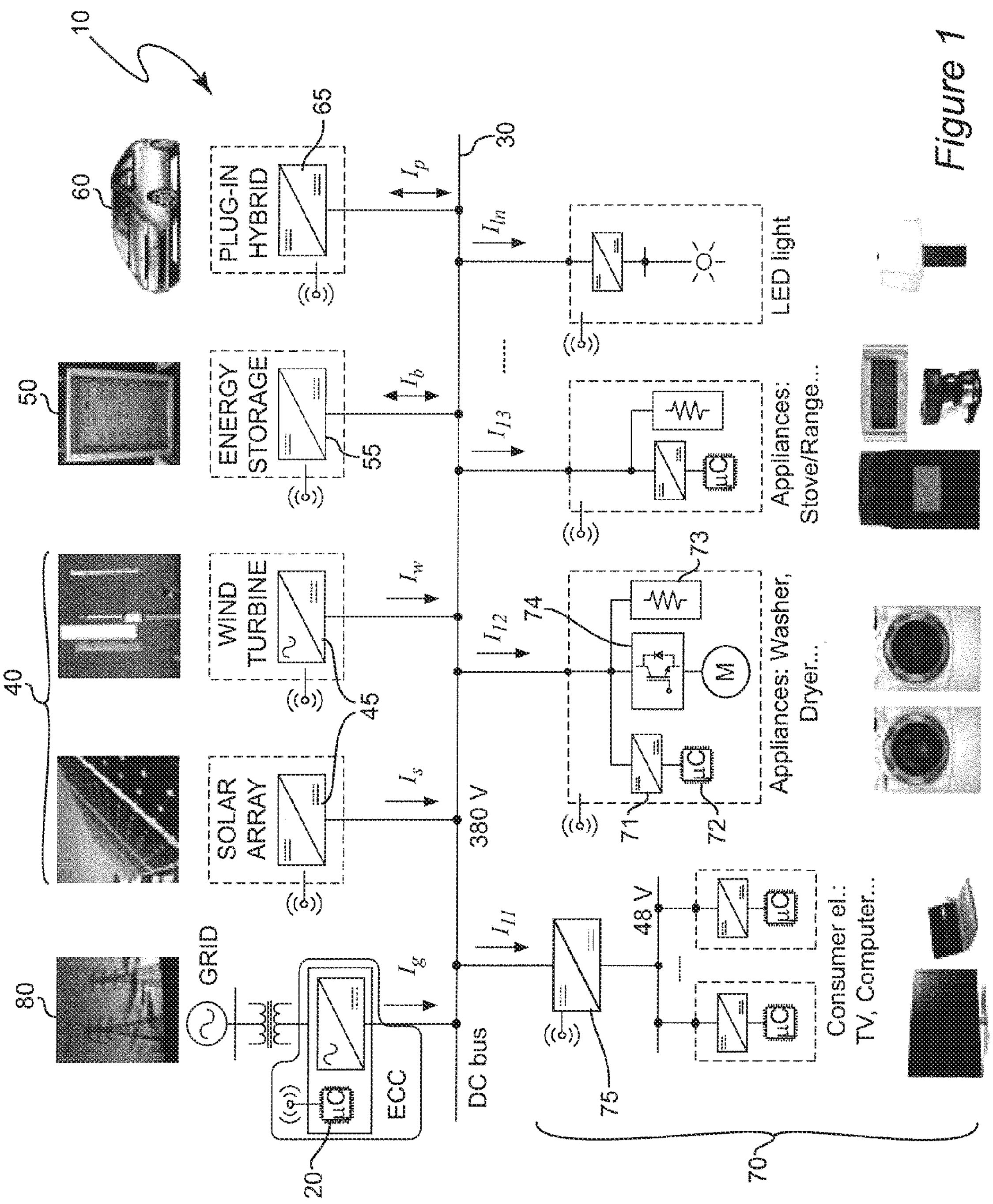
FIG. 1 is a schematic depiction of a DC nanogrid connected to an AC power distribution grid and illustrating an exemplary application of the invention.

Referring now to the drawings, and more particularly to FIG. 1, there is shown, in highly schematic form, a generalized depiction of a DC nanogrid 10 which is an exemplary environment for application of the invention, generally depicted at 20. It should be understood that FIG. 1 is arranged to facilitate an understanding of the application of the invention and no portion of FIG. 1 is admitted to be prior art in regard to the present invention.

Essentially, a DC nanogrid is a power distribution grid which is generally very limited in geographic extent (e.g. limited to a building or one or a limited number of residences or a vehicle such as a ship or aircraft) in which power is distributed over DC bus 30 at a nominal DC voltage of 380 volts although other nominal voltages can be employed and, in any case, the nominal design voltage is unimportant to the successful practice of the invention. It should be understood that DC bus 30 can also be embodied as a plurality of DC busses operating at different voltages. A dual bus arrangement with one bus operating at 380 volts and another bus operating at 48 volts is often employed to provide increased efficiency of power conversion for low voltage DC loads.

DC bus 30 receives locally generated power, preferably from a renewable resource power generator 40 such as a solar cell array or one or more wind turbines. Power input to DC bus 30 is indicated by arrows $I_s$ and $I_w$, depicting current flow. The DC voltage may be changed by DC/DC power converters 45, as may be desired for the particular DC nanogrid design. To maximize utilization of locally generated power, an energy storage arrangement 50 such as a battery bank can be included with a DC/DC converter 55 for DC voltage conversion. The energy storage arrangement can be augmented, if desired, by the batteries in an electric powered or hybrid vehicle 60, again using a DC/DC converter, if needed to obtain a suitable DC voltage relative to DC bus 30. Thus the energy storage arrangement 50 and vehicle 60 can function as either a power source or a load as depicted by bi-directional arrows $I_b$ and $I_p$.

A wide variety of loads 70 may be connected to and receive power from DC bus 30 using DC/AC converters 75, generally referred to as inverters, as needed, depending on whether or not the load is designed to utilize AC power. In this regard, it should be noted that some loads may require both DC and AC power and appropriate power converters may be provided as may be convenient. For example, appliances may use DC/DC converters 71 to power micro-controllers 72 while heating elements 73 may be powered directly from the DC bus and suitable drive arrangements 74 (which need not necessarily be power converters) may be provided for electric motors and the like.

In general, it is desirable to also provide for connection of the DC bus to an AC power distribution grid 80 so that excess locally generated power can be provided thereto or power can be obtained therefrom when locally generated power (including power stored at 50, 60 is insufficient for DC nanogrid loads or when it is desired to retain stored energy for providing power when the AC grid may be inoperative or when it is desired to retain stored energy in vehicle 60 for independent operation thereof. The connection between the DC bus and the AC power grid thus requires a bi-directional AC/DC converter such as that provided by the invention. Suitable electromagnetic interference (EMI) filtering, power factor correction (PFC) and the like are often required to attenuate high frequency switching noise from the power converter 20 and are assumed to be included in the bi-directional AC/DC power converter 20 which is sometimes referred to as an electronic control center (ECC). As will be discussed below, the bi-directional power converter or ECC in accordance with the invention reduces the magnitude of EMI noise and thus simplifies EMI filter design and reduces the cost and volume of the EMI filter and PFC circuitry required to hold such noise to a suitably low level.

Figure 2B:
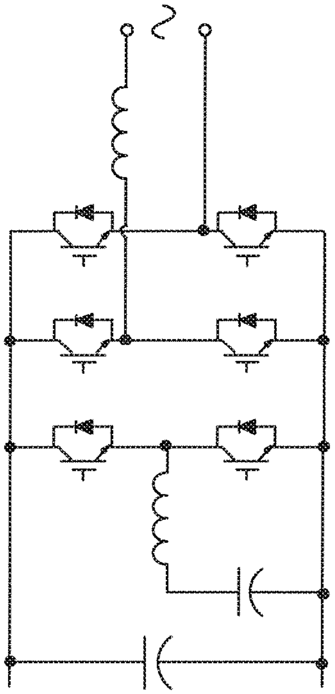
FIGS. 2B, 2C and 2D are schematic diagrams of H-bridge transformerless converter topologies showing known attempts at reducing DC link capacitance.
Figure 2D:
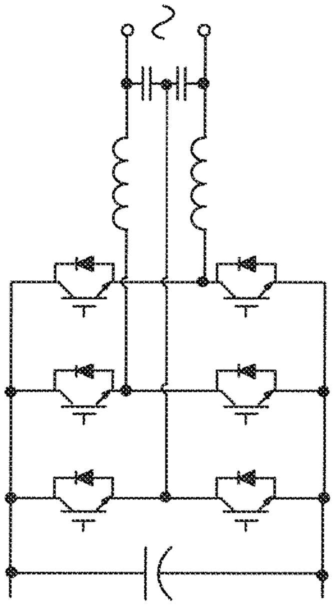
Figure 2A:
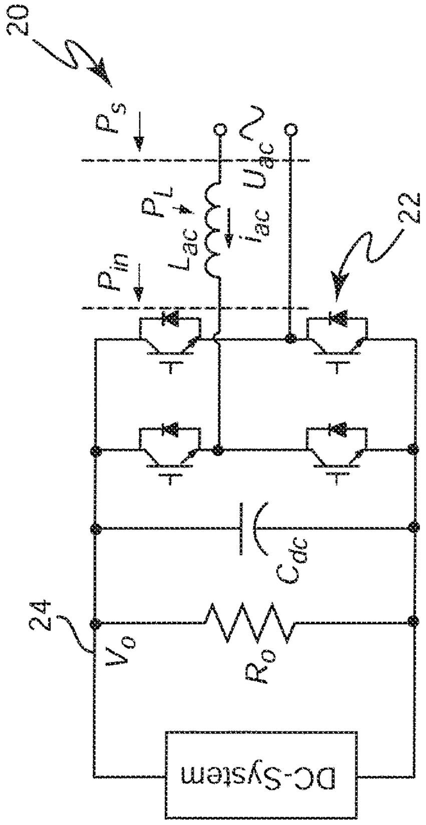
FIG. 2A is a schematic diagram of a single phase H-bridge transformerless converter topology.

Referring now to FIG. 2A, a full bridge or H-bridge converter is shown. FIGS. 2A-2D are generalized to facilitate an understanding of and appreciation for the invention and no part of any of these Figures is admitted to be prior art in regard to the present invention and therefore have been designated “Related Art”. Such a topology has been of substantial interest for interfacing DC and AC systems of up to about 10 KW since it may be operated bi-directionally as either a synchronous rectifier (referred to as a rectifier mode of operation) for AC to DC conversion or as an inverter (referred to as a regeneration mode of operation) for DC to AC conversion. Examples of application of such a converter topology are seen in many solar power and energy storage systems as well as in many electric and hybrid vehicle power systems.

As illustrated, the H-bridge topology principally comprises four switches 22, preferably embodied as insulated gate bipolar transistors (IGBTs) but other types of power switches can be employed. The switches are connected in a full bridge or H-bridge (the terms are used synonymously) configuration as two series-connected pairs of switches; respective switches of each pair of switches being referred to as upper and lower switches, respectively. The upper switches and lower switches are operated in a complementary fashion and the pairs of switches are operated oppositely to each other such that the upper switch of one pair and the lower switch of the other pair are either conductive or non-conductive. It is preferred to pulse width modulate the control signals for the switches substantially sinusoidally at the AC line frequency while the frequency of the switching signals is of a much higher frequency, generally in the range of several kilohertz. As illustrated, the circuitry to the right of the full bridge circuit is referred to as the AC side of the converter and the circuitry to the left of the full bridge circuit is referred to as the DC side and the DC bus 24 is referred to as the DC link. Additional filter elements such as $R_o$, $C_{dc}$ and $L_{ac}$ may be added to either or both of the AC and DC sides of the converter.

While such a switching scheme is preferred since it may be used to transfer power through the converter in either direction and thus can provide a smooth transition in direction of power transfer, a ripple voltage will appear on the DC link as a natural consequence of AC to DC conversion and the magnitude of the ripple will increase with the load on the DC side of the converter. When power is being transferred from the AC side to the DC side, in particular, such connections cause a substantial voltage ripple voltage on the DC side of the converter which includes components at the AC line frequency and double the AC line frequency as well as high frequency components due to switching of the synchronous rectifier (SR) bridge switches. To stabilize the ripple voltage and hold the ripple voltage to a suitably low level as well as to supply power during load transients with only an acceptably small change in DC voltage level, the value of the DC link capacitor, $C_{dc}$, must generally be very large; requiring use of electrolytic capacitors which are somewhat subject to failure, particularly when large currents are applied to them from the second order ripple energy from the AC power grid. Electrolytic capacitors of large value are also of large volume and thus greatly reduce the power density of the power converter. It should also be noted from FIG. 2A that no active internal current limit protection is provided because the grid current will be conducted by the anti-parallel diodes of the switches if the DC link is shorted. Therefore, additional current limiting protection devices must be additionally provided; further reducing potential power density of the converter.

Figure 2C:
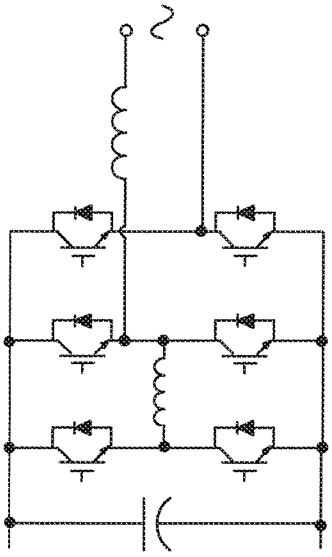

Numerous modified topologies have been proposed to reduce the required DC link capacitance and the physical volume thereof; examples of which are illustrated in FIGS. 2B-2D. All of these approaches use an additional switching stage and an inductor or capacitor as an auxiliary circuit to reduce voltage ripple. For example, the circuit of FIG. 2B uses a series LC circuit in parallel with the lower switch of the additional stage to transfer the ripple power to the additional capacitor through the inductor. The principal drawback of this circuit is the high loss in the inductor. In the circuit of FIG. 2C, an inductor is connected between the common nodes of one of the pairs of switches of the first stage and the switches of the second stage to store the ripple energy in the inductor which is necessarily bulky. In the circuit of FIG. 2D, the common node of the second stage is connected to the mid-point of a capacitive voltage divider on the AC side of the converter to store the ripple energy back to the AC side capacitor. A common drawback of all these approaches is the additional power loss due to the losses in the additional stage and the difficulty of linear feedback control design. While these approaches have been somewhat successful is achieving a degree of reduction in required DC link capacitance to limit ripple voltage magnitude, the reduction has been relatively small. Also, the performance of all of these examples are sensitive to operating conditions such as passive element values, AC side power factor angle, and the like due to the lack of robust controllers. They also do not provide a current limit function and bi-directional operation and smooth transition between directions of power transfer has not, to the knowledge of the inventors, been documented.

Figure 3:
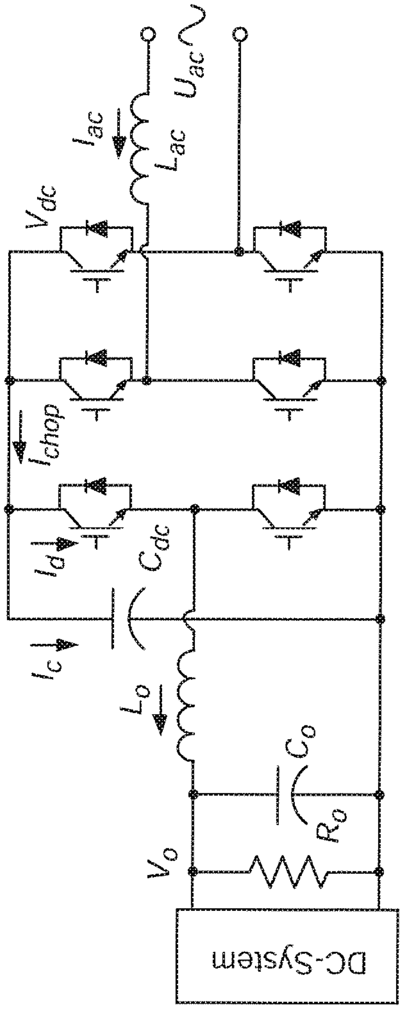
FIG. 3 is a schematic diagram of a two stage bi-directional single phase PWM converter topology.

Referring now to FIG. 3, a two stage bi-directional PWM converter topology in accordance with the invention is schematically shown. In FIG. 3, the second stage of the converter is operated as a DC/DC buck converter powered from the DC link. Other converter topologies can also be used but a buck converter is preferred due to its simplicity, simplicity of control and small number of elements which are highly reliable. It should also be noted that the topology of the buck converter, as illustrated, also provides a boost function for DC to AC power conversion. The second stage is thus sometimes referred to as a bi-directional synchronous rectifier (SR) DC/DC converter which operates as either a buck converter or a boost converter, depending upon the direction of power transfer.

The upper switch periodically connects the buck converter to the DC link for a duty cycle controlled in accordance with $V_0$ while the lower switch, operated in a complementary fashion to the upper switch operates to supply so-called free-wheel current to inductor $L_0$ when the upper switch of the second stage is disconnected. Since the second stage converter operates in a synchronous rectifier mode, it always operates in a continuous current mode even at light load conditions. Therefore, it can easily achieve a seamless transition in power flow direction. Thus the second stage provides both close regulation of voltage (allowing substantial DC link ripple to be tolerable and substantial and dramatic reduction of $C_{dc}$) and very fast transient response limiting the need for large filter capacitance, $C_0$. Moreover, in terms of system-level design and observation of interactions of DC bus converters, the second DC/DC stage is deemed advantageous over directly drawing power from the DC link of the H-bridge interface to the DC system since, if power is taken directly from the DC link, the complicated quasi-static analysis must be used for terminal characterization of the H-bridge topology. Further, some current limitation is inherent in the buck converter second stage and further current limitation can be easily provided in the control arrangement for the second stage switches.

Figure 4:
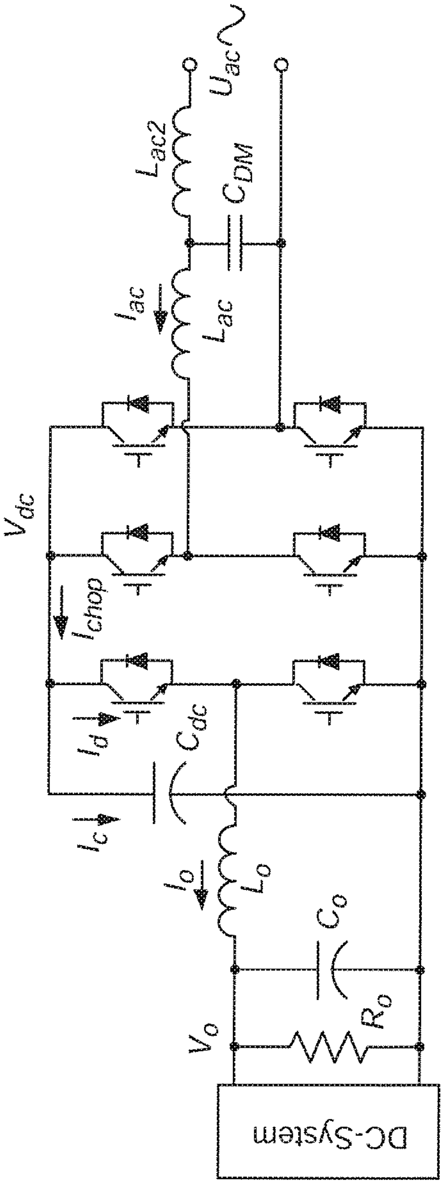
FIG. 4 is a schematic diagram of an exemplary embodiment of the invention.

The potential dramatic reduction in DC link capacitance will now be demonstrated with reference to FIG. 4. FIG. 4 differs from the basic circuit in accordance with the invention shown in FIG. 3 only in the provision of a differential mode EMI noise filter on the AC side of the converter which is formed simply by splitting inductor $L_{ac}$ of FIG. 3 into two series connected inductors $L_{ac}$ and $L_{ac2}$ and coupling a capacitor, $C_{DM}$, across the AC line connections from the node connecting the two inductors to provide a bypass path for differential mode (DM) noise to prevent DM noise from reaching the grid.

As shown in FIG. 1, the grid current and voltage are defined below in equations (1), (2), of which the power factor (PF) angle is $\phi$. The symbols "$U_s$" and "$u_{ac}$" refer to the AC voltage amplitude and the AC voltage, respectively.

$$i_{ac}=I_s\sin(\omega_o t-\phi) \tag{1}$$

$$u_{ac}=U_s\sin(\omega_o t) \tag{2}$$

The power ($P_{in}$) that flows through the full-bridge topology will be the input power ($P_s$) reduced by the instantaneous power ($P_L$) dissipated on the ac boost inductor $L_{ac}$. $P_s$, $P_L$, and $P_{in}$ are shown in (3), (4), and (5), respectively.

$$P_s=\frac{U_sI_s}{2}\cos\varphi-\frac{U_sI_s}{2}\cos(2\omega_o t-\varphi) \tag{3}$$

$$P_L=\frac{1}{2}\omega_o L_{ac}I_s^2\sin(2\omega_0 t-2\varphi) \tag{4}$$

$$P_{in}=P_s-P_L \tag{5}$$

$P_{in}$ consists of two parts: the second-order ripple power $P_r$ given by equation (6) and the dc average power $P_{av}$ given by equation (7).

$$P_r=A\ \sin(2\omega_0 t-2\varphi+\psi),\quad A=\sqrt{\frac{U_s^2I_s^2\cos^2\varphi}{4}+\left(\frac{\omega_o L_{ac}I_s^2}{2}-\frac{U_sI_s}{2}\sin\varphi\right)^2},\quad \psi=\arctan\frac{\frac{U_sI_s}{2}\cos\varphi}{\frac{\omega_o L_{ac}I_s^2}{2}-\frac{U_sI_s}{2}\sin\varphi} \tag{6}$$

$$P_{av}=\frac{U_sI_s}{2}\cos\varphi \tag{7}$$

$$\Delta V_{o\_pp}=\frac{\sqrt{P_{av}^2+\left(\frac{2\omega_o L_{ac}P_{av}^2}{U_s^2\cos^2\varphi}-P_{av}\frac{\sin\varphi}{\cos\varphi}\right)^2}}{\omega_o V_{o\_av}C_{dc}} \tag{8}$$

$$V_{o\_av}=\frac{v_{o\_max}+v_{o\_min}}{2} \tag{9}$$

Normally, to suppress the voltage ripple a large DC link capacitor $C_{dc}$ is required and is subject to the ripple power. Specifically, the required DC link capacitance for a converter designed for an average DC voltage of 380 volts at 10 KW power and an inductor ($L_{ac}$) value of 300 μH a switching frequency of 2π60 rad./sec. and a 10 volt peak-to-peak ripple is 6.9 mF which generally requires a bank of electrolytic capacitors and may present a significant hazard since, as alluded to above, the circuit of FIG. 1 does not include any current limiting arrangement.

For the two-stage topology shown in FIG. 4, instead of delivering power directly from the DC link as filtered by the intermediate DC link capacitor, $C_{dc}$, the DC system is directly interfaced to the second-stage synchronous rectifier (SR) DC/DC converter which regulates the DC bus voltage within the design specifications of the system. This inclusion of a regulator offers an opportunity to reduce the value of $C_{dc}$ to improve the overall power density since the regulator permits substantially greater variation in input voltage to the second stage to be tolerated while limiting the variation in DC voltage connected to the DC system. Of course, increased voltage ripple creates additional electrical stress for the DC link capacitor but that potential problem is also solved in accordance with the invention as will be discussed more fully below.

As shown in FIG. 4, the reduction of the DC link capacitor $C_{dc}$ will naturally yield a large DC link voltage variation. In order to make the SR DC/DC converter operate under the specifications, two requirements must be fulfilled. First, if the DC bus voltage $V_o$ is regulated with a very small ripple, the input power $P_{in}$ should be fully controlled so that all the dc average power $P_{av}$ and ripple power $P_r$ goes to the DC-DC converter and the small DC link capacitor $C_{dc}$, respectively. Second, the input current for this mode of operation can still be well-controlled as a sinusoidal waveform at PF angle $\phi$.

If the instantaneous power $P_L$ dissipated on the boost inductor, $L_{ac}$, is neglected, the first requirement can be expressed in equation (10) (e.g. that the instantaneous power $P_{cap}$ in the DC link capacitor is the same as the input ripple power $P_r$ on the right-hand side of the equation).

$$P_{cap}=v_{dc}\cdot i_c=-\frac{U_sI_s}{2}\cos(2\omega t-\varphi)\quad\Leftrightarrow\quad C_{dc}\frac{d\,v_{dc}}{dt}\cdot v_{dc}=-\frac{U_sI_s}{2}\cos(2\omega t-\varphi) \tag{10}$$

By solving the differential equation (10), the DC link voltage $v_{dc}$ can be resolved as shown in equation (11) and the maximum and minimum DC link voltages allowable while maintaining specified regulation is shown in equation (12).

$$v_{dc}=\sqrt{K_{c\_const}-\frac{U_sI_s}{2C_{dc}\omega_o}\sin(2\omega t-\varphi)} \tag{11}$$

$$v_{dc\_min}=\sqrt{K_{c\_const}-\frac{U_sI_s}{2C_{dc}\omega_o}},\quad v_{dc\_max}=\sqrt{K_{c\_const}+\frac{U_sI_s}{2C_{dc}\omega_o}} \tag{12}$$

The constant value $K_{c\_const}$ physically represents the energy stored in the DC link capacitor. The definition of average DC link voltage $V_{av}$ is shown in (13). As such, the $K_{c\_const}$ and average DC link voltage $V_{av}$ is established below in equation (14). The DC link voltage $v_{dc}$ is given in equation (15).

$$V_{av}=\frac{v_{dc\_min}+v_{dc\_max}}{2} \tag{13}$$

$$K_{c\_const}=V_{av}^2+\left(\frac{U_sI_s}{4V_{av}C_{dc}\omega_o}\right)^2 \tag{14}$$

$$v_{dc}=\sqrt{\left(V_{av}+\frac{U_sI_s}{4V_{av}C_{dc}\omega}\right)^2-\frac{U_sI_s}{2C_{dc}\omega}[1+\sin(2\omega t-\varphi)]} \tag{15}$$

Since the quantity under the radical in equation (15) must, mathematically, be greater than zero, it is seen that the following inequality should be maintained.

$$\left(V_{av}+\frac{U_sI_s}{4V_{av}C_{dc}\omega}\right)^2>\frac{U_sI_s}{2C_{dc}\omega}[1+\sin(2\omega t-\varphi)] \tag{16}$$

As seen in expression (16), this inequality is always valid for any DC link capacitor value; therefore, the DC link capacitor value, $C_{dc}$ does not affect the first requirement.

The averaged DC link capacitor current $i_c$ and the current flowing to the DC-DC converter $i_d$ can in turn be derived as:

$$i_c=\frac{-\frac{U_sI_s}{2}\cos(2\omega t-\varphi)}{\sqrt{\left(V_{av}+\frac{U_sI_s}{4V_{av}C_{dc}\omega_o}\right)^2-\frac{U_sI_s}{2C_{dc}\omega_o}[1+\sin(2\omega_o t-\varphi)]}} \tag{17}$$

$$i_d=\frac{-\frac{U_sI_s}{2}\cos\varphi}{\sqrt{\left(V_{av}+\frac{U_sI_s}{4V_{av}C_{dc}\omega_o}\right)^2-\frac{U_sI_s}{2C_{dc}\omega_o}[1+\sin(2\omega_o t-\varphi)]}} \tag{18}$$

Figure 5:
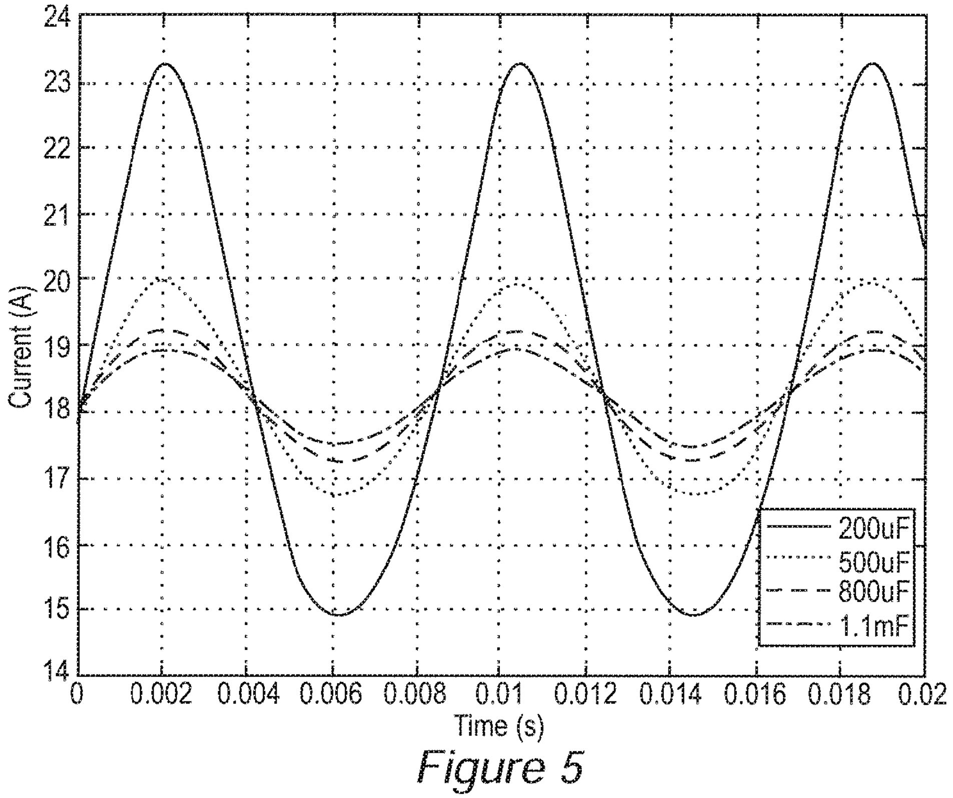
FIG. 5 is a graphical depiction of current flowing to the second stage of the converter of FIG. 4.
Figure 6:
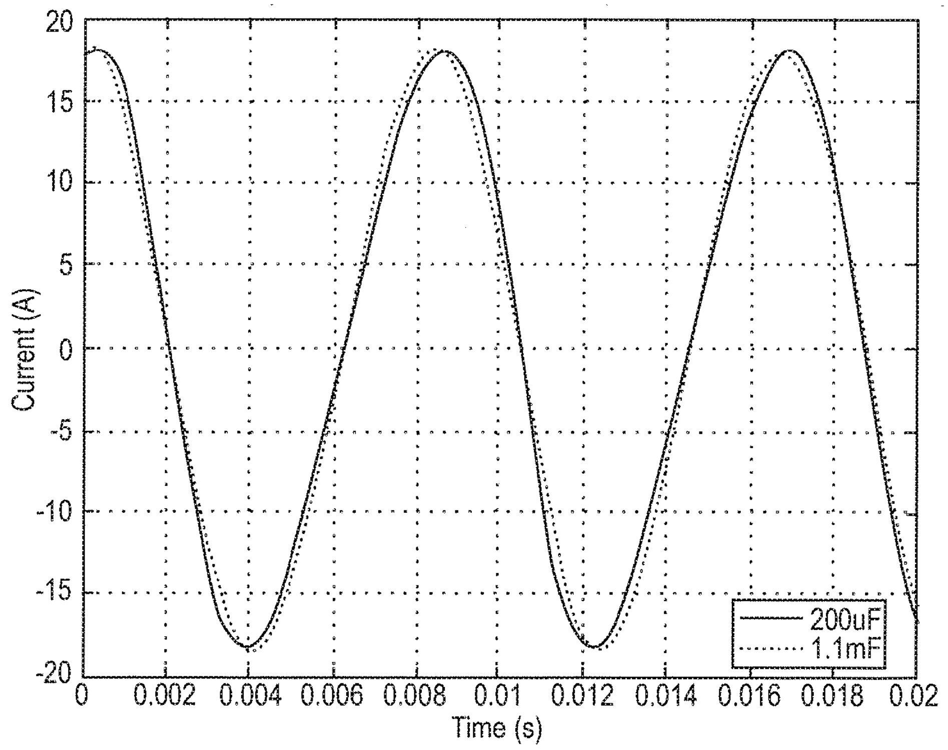
FIG. 6 is a graphical depiction of the current flowing to the DC link capacitor in the circuit of FIG. 4.

By assuming the DC link average voltage is 550V and the average power is 10 kW, the average current, $i_d$, that flows to the second-stage and the average DC link capacitor current $i_c$ are shown in FIG. 5 and FIG. 6, respectively for different DC link capacitor values. It is seen that change of dc-link capacitor $C_{dc}$ does not increase the DC link capacitor current (or the required current rating).

For the second requirement, it should be noted that the DC link current $i_{chop}$ is the switching current with the rectified sinusoidal profile. The average value of $i_{chop}$ should be confined within the profile of ac current $I_{ac}$ such that the second requirement can be written as equation (19). Substituting equations (17) and (18) into equation (19) gives equation (20).

$$|i_d+i_c|=|i_{chop}|<|I_s\sin(\omega_0 t-\phi)| \tag{19}$$

$$U_s<V_{dc} \tag{20}$$

Figure 7:
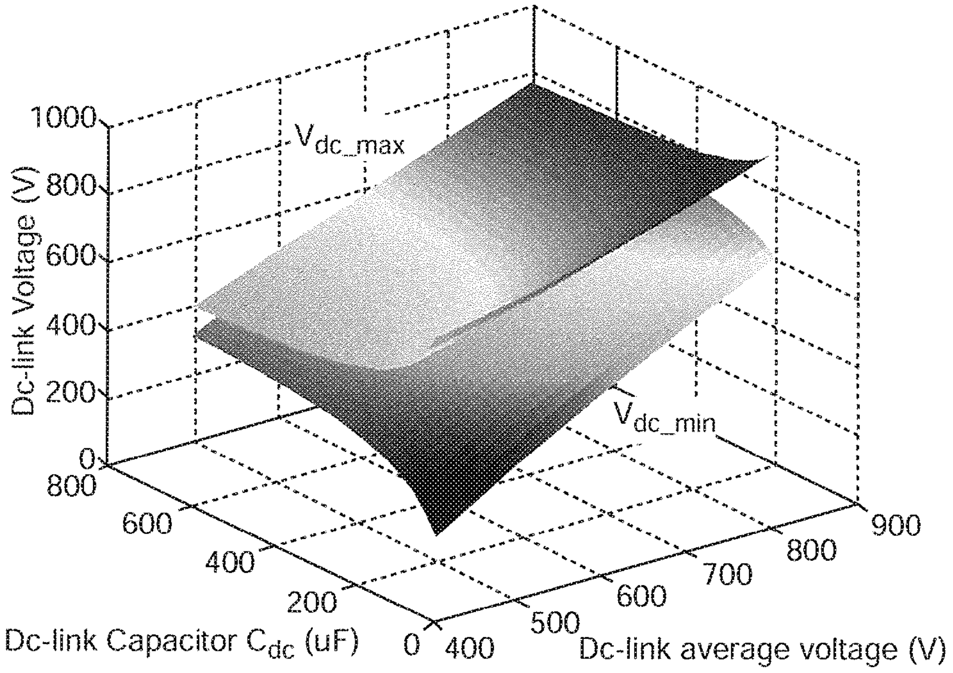
FIG. 7 is an isometric graphical depiction illustrating the relationship of the DC link capacitance to the maximum and minimum DC link voltages and average DC link voltage.

Equation (20) indicates that the input grid peak voltage $U_s$ must always be smaller than the DC link voltage $V_{dc}$, which is also the operation requirement for the first-stage H-bridge. Thus, the DC-DC converter regulating the DC bus voltage $V_o$ with a small ripple plus the H-bridge regulating AC current with small DC link capacitor, $C_{dc}$, are applicable. For this case, the design of this small $C_{dc}$ lies in the trade-off between the power level, $P_{av}$, the average DC link voltage $V_{av}$, and the allowable DC link voltage variation range. For a 10 kW average power level case, the relationship between DC link maximum and minimum values ($V_{dc\_max}$, $V_{dc\_min}$) the DC link voltage average value $V_{av}$, and the DC link capacitor value $C_{dc}$ is shown in FIG. 7.

In order to find the minimum DC link capacitor value, the minimum DC link voltage value is set as 450 V as the output voltage $V_o$ (DC system bus voltage) is controlled at 380 V, and the maximum value is set as 650 V to limit high voltage. From equations (12)-(14), the boundary of dc-link capacitor value is obtained as follows $$C_{dc}\geqq\frac{U_sI_s}{4(V_{av}-V_{min})V_{av}\omega_o} \tag{21}$$

$$C_{dc}\leqq\frac{U_sI_s}{4(V_{max}-V_{av})V_{av}\omega_o} \tag{22}$$

Figure 8:
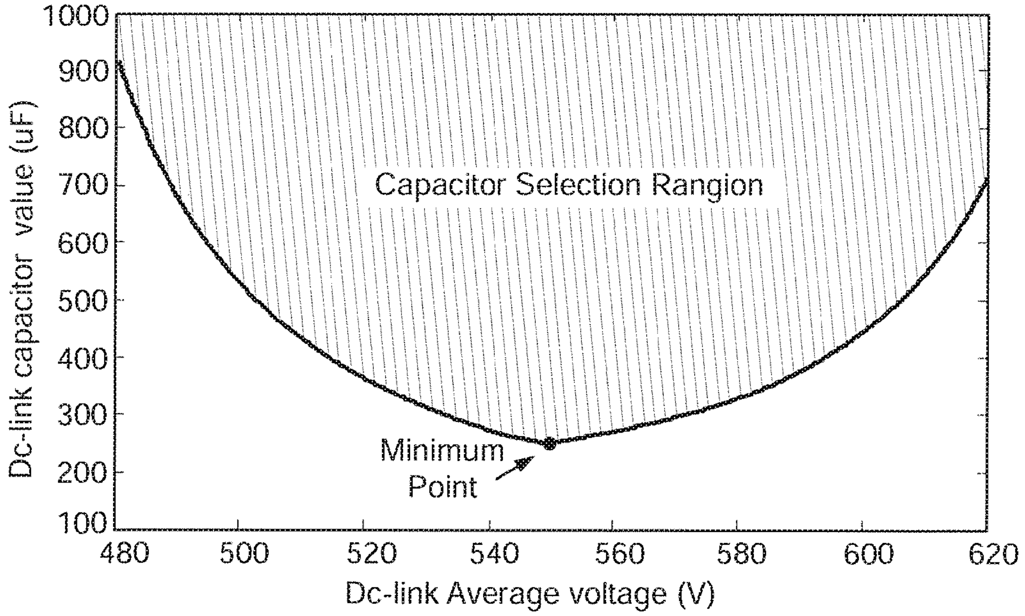
FIG. 8 is a graphical depiction illustrating choice of minimum DC link capacitance value.

The DC link capacitor selection region based on (21), (22) can be readily found as shown in FIG. 8. The minimum capacitor value can be directly found graphically in FIG. 8 as the minimum of the capacitor selection region. Alternatively, the minimum DC link capacitor value may be analytically derived as shown in equation (23).

$$C_{dc}\geqq\frac{U_sI_s}{(V_{max}^2-V_{min}^2)\omega_0} \tag{23}$$

As a result, the minimum DC link capacitor value is found to be 241 uF, more than an order of magnitude less than the DC link capacitor value that would be required without the second stage regulator in accordance with the invention. That is, compared to 6.9 mF, there is a huge reduction margin in DC link capacitor and, importantly, volume and cost. Further, the reduction of required DC link capacitor value allows the DC link capacitor to be embodied in other capacitor technologies such as film capacitors which are much less subject to unpredictable failure than electrolytic capacitors but are also much more tolerant of electrical stress.

However, the reduction of DC link capacitor value, $C_{dc}$, in turn poses challenges to the controller design for separating the ripple power and DC average power, as will now be discussed.

Figure 9:
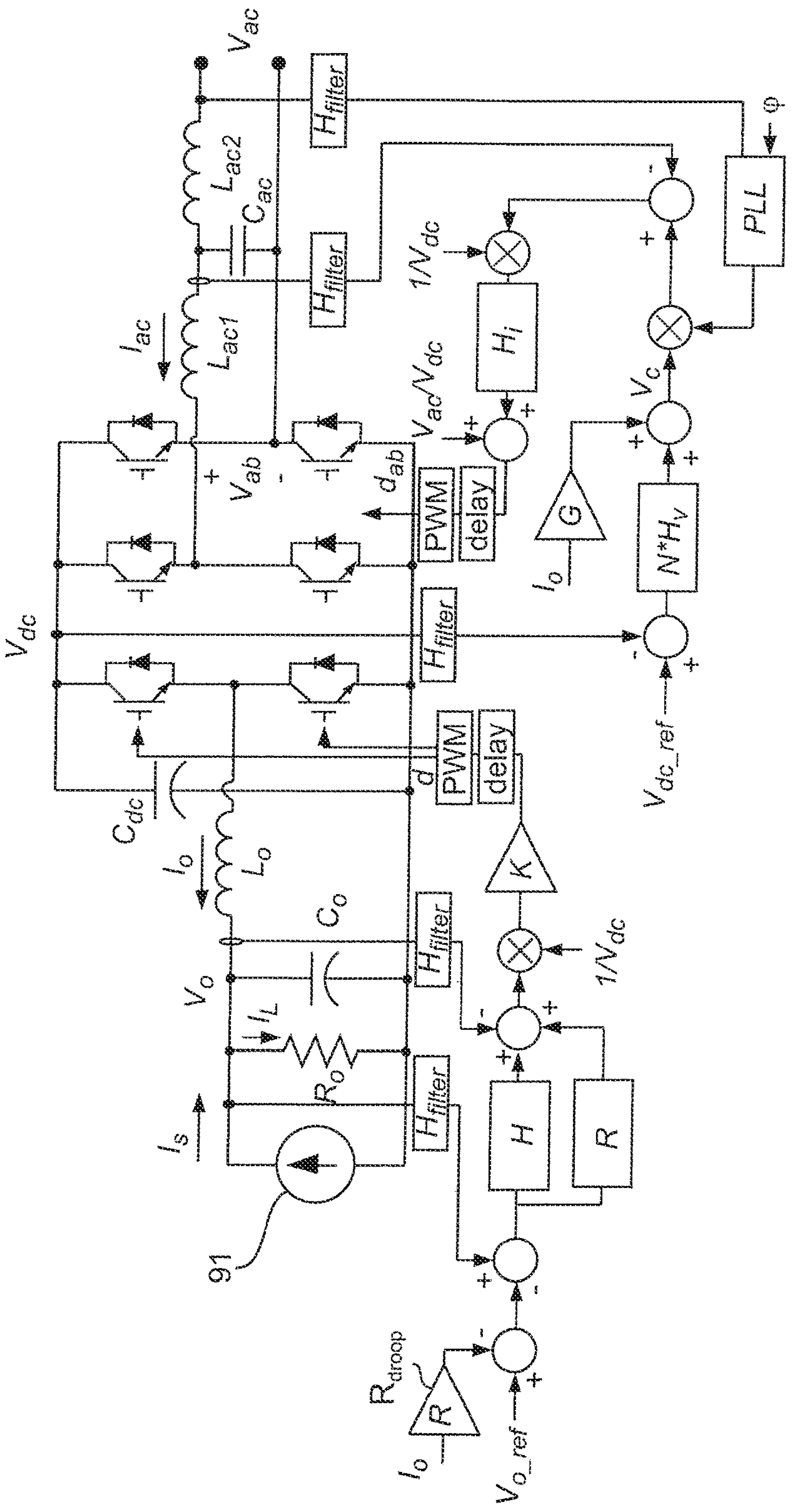
FIG. 9 is a schematic diagram of a preferred embodiment of the invention including the control circuitry in accordance with a preferred embodiment of the invention, FIG. 10 schematically illustrates small signal models of buck and boost operational modes of the converter in accordance with the invention.

The preferred digital control structure for bi-directional converter operation comprises two independent controllers as shown in FIG. 9. In the following analysis and discussion, DC renewable energy resources are simply modeled as current sources and collectively depicted at 91. Basically, one controller is used to control the DC bus voltage, $V_o$, by operating the second stage DC-DC converter as an SR buck mode or SR boost mode, depending on the power flow direction. The proportional gain, K, in the dc current loop is applied to damp the resonance from $L_o$, $C_o$ filter, and the carefully designed digital compensator transfer function H plus resonant controller R are used to accomplish high bandwidth and high loop-gain especially at double-line frequency (e.g. 120 Hz) to handle a large input ($V_{dc}$) variation as well as regulate the output voltage $V_o$. The other double-loop controller controls the H-bridge topology. The outer-loop controls the DC link average voltage, $V_{dc}$, in conjunction with an additional load current feedback term, G); while the inner-loop regulates the power from the grid. The outer-loop controller has a notch-filter, N in series with PID, $H_v$) to correct the control signal, achieving a low total harmonic distortion (THD) of the AC current regulation.

The control delay due to the sensor filter and digital computation must be modeled. Each sensor filter is assumed to be a second-order, low-pass filter, $H_{filter}$, the transfer function for which is given in equation (24).

$$H_{filter}=\frac{1}{\left(\frac{s}{2\pi f_l}\right)^2+\left(\frac{s}{Q_l 2\pi f_l}\right)+1} \tag{24}$$

A one switching-cycle ($T_s$) delay, $H_{delay}$, provided in equation (25), is modeled in the modulator to approximate the digital computation and A/D conversion delay.

$$H_{delay}=e^{-sT_{delay}}=\frac{1-0.5sT_{delay}+\frac{(sT_{delay})^2}{12}}{1+0.5sT_{delay}+\frac{(sT_{delay})^2}{12}},\ T_{delay}=T_s \tag{25}$$

The modulator gain is assumed to be unity. It should be noted that the nonlinear sample-and-hold effect in the current loop can be neglected due to the average current mode control which is preferred for practice of the invention.

It is a necessary step to establish the small-signal models in order to design the controller for H, R, K, $H_v$, N, $H_i$, and G. There is no control-to-AC-current small-signal model of the full-bridge that fully describes the dynamics from DC up to Nyquist frequency. In order to design the current loop compensator, a quasi-static modeling approach can be applied to model the current loop behavior at the high-frequency range. Therefore, the low frequency dynamics, due to the 120 Hz voltage ripple, can be ignored. The small-signal control-to-current transfer function of the H-bridge is obtained in equation (26), in which $d_{ab}$ is the average duty-cycle signal of the H-bridge. The input impedance of the second-stage converter will be the loading effect to the first-stage. D is the steady-state duty-cycle of the second-stage converter. Within the DC bus voltage loop bandwidth, the $Z_{in}$ is like a constant power load. Normally, the bandwidth of $V_o$ loop is lower than that of the ac current loop; thus the $Z_{in}$ at the high-frequency range for equation (27) would be the unregulated input impedance of the second-stage converter. As such, the $$H_i = k_{iac}\frac{(s+\omega_{ziac})(s+\omega_{ziac})}{s(s+\omega_{piac})(s+\omega_{piac})}$$

can be designed to compensate $G_{id}$ to achieve the high bandwidth and desired phase-margin around the cross-over frequency. It is also seen that the current dynamics above the resonance frequency ($L_{ac}$, $C_{dc}$) will be mostly dominated by the AC boost inductor $L_{ac}$, and equation (26) can be simplified as shown in equation (28).

$$G_{id} = \frac{\tilde{i}_{ac}}{\tilde{d}_{ab}} = V_{dc}\frac{2 + sZ_{in}C_{dc}}{d_{ab}^2 Z_{in} + sL_{ac} + s^2 Z_{in}L_{ac}C_{dc}} \quad (26)$$

$$Z_{in} = \frac{1}{D^2}\frac{s^2 L_o R_o C_o + sL_o + R_o}{1 + sR_oC_o} \quad (27)$$

$$G'_{id} = \frac{\tilde{i}_{ac}}{\tilde{d}_{ab}} = V_{dc}\frac{1}{sL_{ac}} \quad (28)$$

By assuming an ideal current loop is implemented in the H-bridge, the design of $H_v$ is simply based on the current-to-DC-link-voltage small-signal transfer function as shown in equation (29) by considering the second converter stage as a constant power load, in which h is the scaling factor of the PLL. The design bandwidth of $$H_v = k_{vo}\frac{s+\omega_{zvo}}{s(s+\omega_{pvo})}$$

should not be beyond the double line-frequency.

$$G_{iv} = \frac{\tilde{v}_{dc}}{\tilde{v}_c} = \frac{V_{acRMS}^2}{hV_{dc}}\frac{1}{sC_{dc}} \quad (29)$$

The variable G shown in (30) is the feed-forward term to balance the power between the first and second stages of the converter in accordance with the invention and thus is applied to balance the power between the DC load and the AC grid, and also to improve the DC link voltage regulation transient response time especially during the load transient period. $G_{id}$ is the transfer function from control duty cycle to output AC current, $G_{iv}$ is the transfer function from DC link voltage to output AC current. $G_{id}$ and $G_{iv}$ are used as the control plant model for design of the controller. The $V_{acRMS}$ denotes the grid voltage RMS value, and $V_{dc\_ref}$ as the DC link voltage reference.

$$G = \frac{V_{dc\_ref}}{V_{acRMS}} \quad (30)$$

Figure 10:
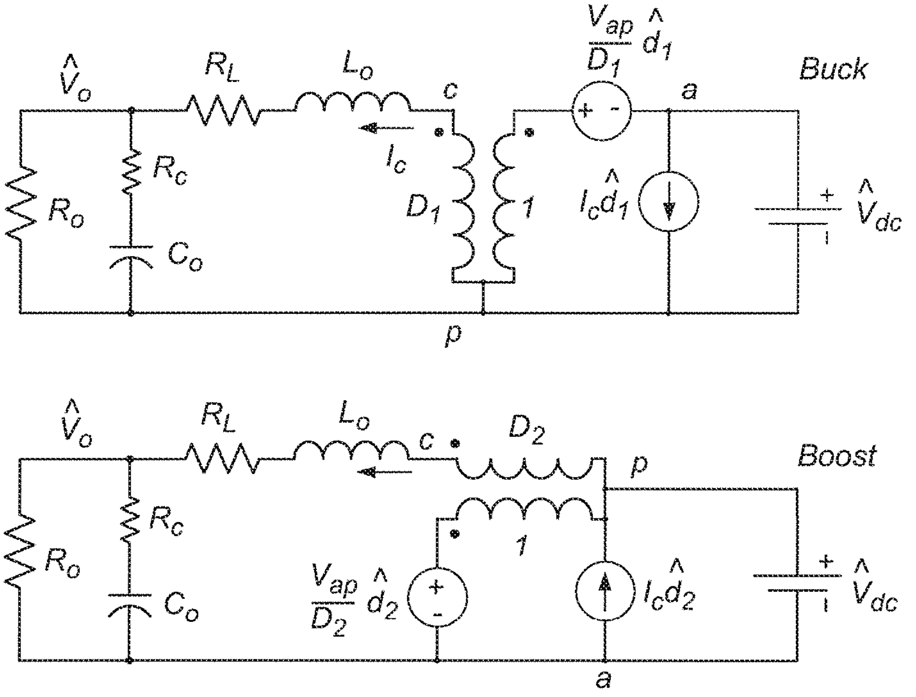

To design the second-stage voltage loop controller, the small-signal models of the second-stage converter at buck mode (rectifier mode) and boost mode (regenerative mode) are found in FIG. 10. Notice that under the same input/output conditions, the duty cycle of the buck/boost mode in FIG. 10 must meet the following equation in (31).

$$d = d_1 = 1 - d_2 \quad (31)$$

Figure 11:
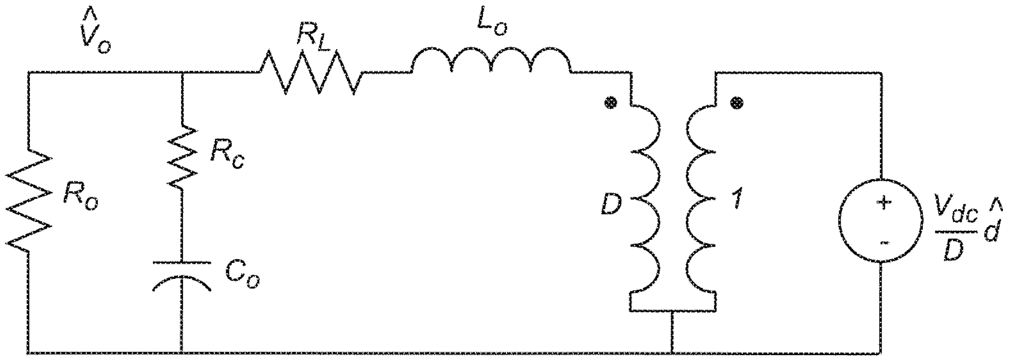
FIG. 11 is a schematic diagram illustrating a generic control-to-output small signal model of a converter in accordance with the invention.

Under the conditions of equation (31) it can be shown that the buck mode and the boost mode of the second-stage both have the same control-to-output small-signal model as shown in FIG. 11. The control-to-output transfer function is then found in equation (32) to design one $$H = k_{io}\frac{(s+\omega_{zio})(s+\omega_{zio})}{s(s+\omega_{pio})(s+\omega_{pio})}$$

for both modes of operation. $R_c$ and $R_L$ are the equivalent series resistances (ESRs) of $C_o$ and $L_o$, respectively.

$$G_{vd} = \frac{\tilde{v}_0}{\tilde{d}} = V_{dc}\frac{\left(1+\frac{s}{\omega_2}\right)}{\left(\frac{s}{\omega_o}\right)^2 + \frac{s}{\omega_o Q} + 1},\ \omega_z = \frac{1}{R_cC_o}, \quad (32)$$

$$\omega_o = \sqrt{\frac{R_o + R_L}{(R_o + R_c)L_oC_o}},\ Q = \frac{\sqrt{(R_o+R_c)L_oC_oR_o}}{L_o + R_cR_oC_o}$$

Figure 12:
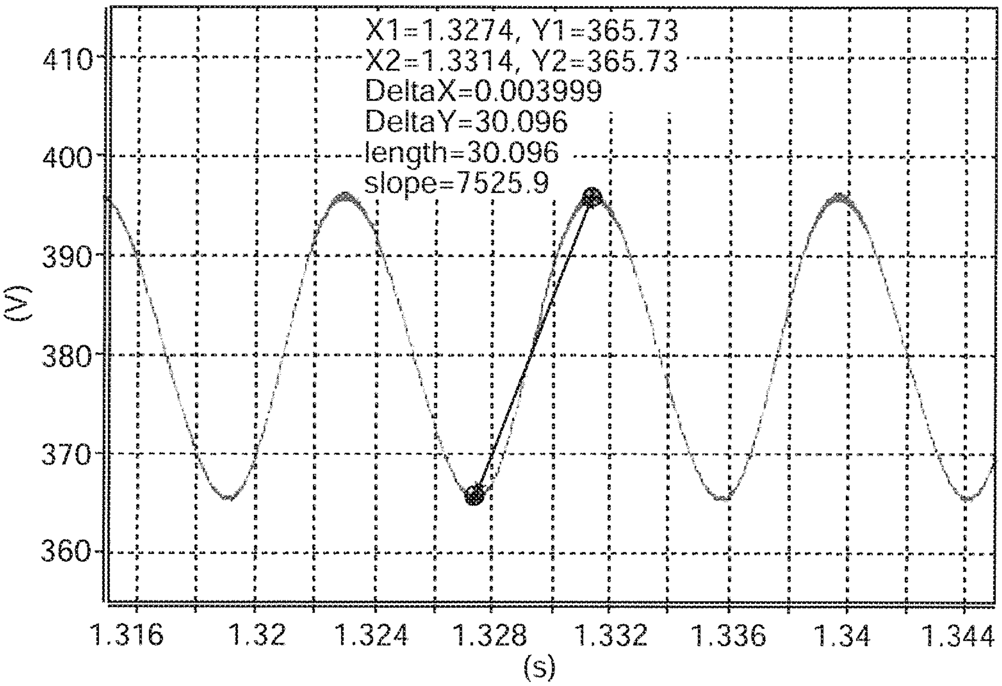
FIG. 12 is a graphical illustration of the DC output voltage without the resonant controller, R, of FIG. 9.

Several more control techniques must be implemented to sufficiently separate the DC average power and ripple power into two paths with the small DC link capacitors. The DC link voltage will include a large 120 Hz ripple variation during full load conditions. This input variation will affect the output voltage $V_o$ will transfer through the second stage DC/DC converter and will eventually appear on the output $v_o$ due to the finite loop-gain at 120 Hz. That is, the second stage DC/DC converter voltage control loop gain at 120 Hz is not high enough to correct the output voltage ripple. It is seen in FIG. 12 that $V_o$ has a 30 V voltage ripple at 120 Hz under 10 KW power transfer conditions.

In order to suppress this voltage ripple, additional high gain is added onto the control loop by implementing a resonant controller as follows.

$$R(s) = k\frac{s}{s^2 + (2\omega_0)^2} \quad (33)$$

Figure 13:
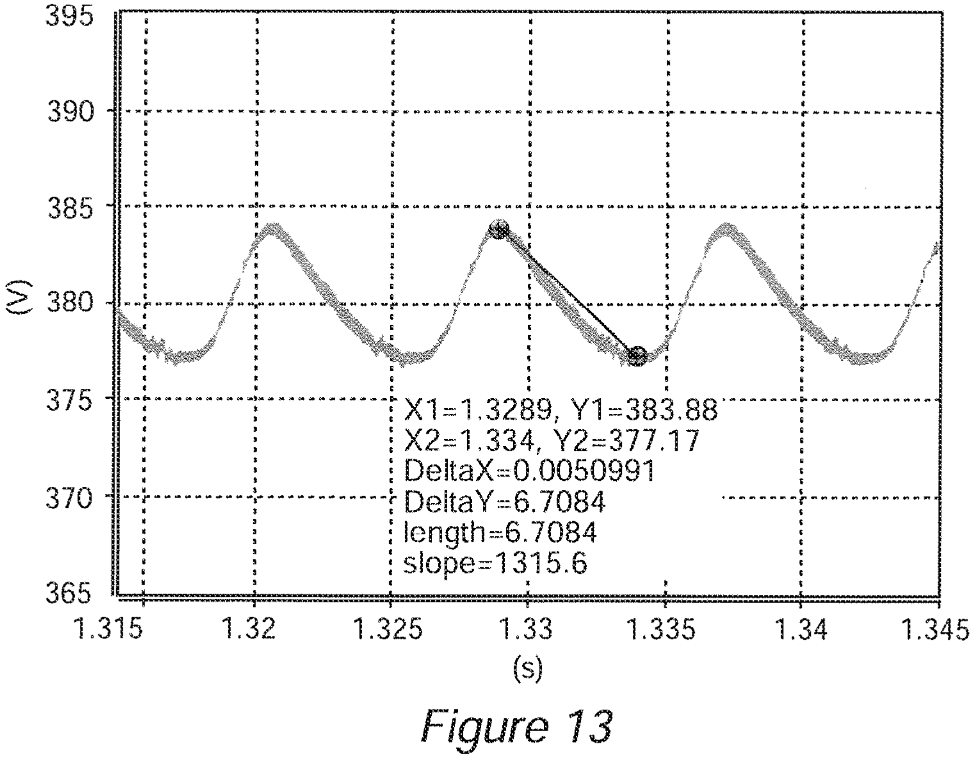
FIG. 13 is a graphical illustration of the DC output voltage with the resonant controller, R, of FIG. 9.

The resonant controller, when $\omega_o = 2\pi 160$ rad/s, approaches achievement of infinite gain at 120 Hz. As such, the voltage ripple can be greatly reduced, as shown in FIG. 13, to only about 7 Volts under full-load conditions.

In addition, the loop-gain at 120 Hz provided by the DC link voltage controller $H_V$ is not negligibly small although insufficient to fully compensate the large voltage variation on the DC link which is the input to the second stage SR DC/DC converter. As such, relatively large 120 Hz components are still included in the output of the DC link voltage controller $v_c$, which is also the AC current magnitude reference as seen in FIG. 9, thus affecting the AC current regulation performance. Thus to reduce the 120 Hz ripple further, the control loop gain should be further increased at 120 HZ by use of a parallel resonant controller, R, to increase the loop gain. As seen in equation (34), the PLL line-frequency signal will modulate with this double-line-frequency component in $v_c$, yielding the third-order current harmonics. $K_{Vdc}$ and $K_{V120}$ are the DC link voltage loop gain at DC and 120 Hz, respectively. The sum of these gains can then be conveniently scaled by $K=k_{fw}$.

$$\begin{aligned} i_{ac\_ref} &= h\ \sin(\omega_o t + \varphi) \cdot v_c \\ &= h\ \sin(\omega_o t + \varphi) \cdot [K_{Vdc} \cdot \Delta v_{dc} + K_{V120} \cdot V_r\ \sin(2\omega_o t)] \end{aligned} \tag{34}$$

Figure 14:
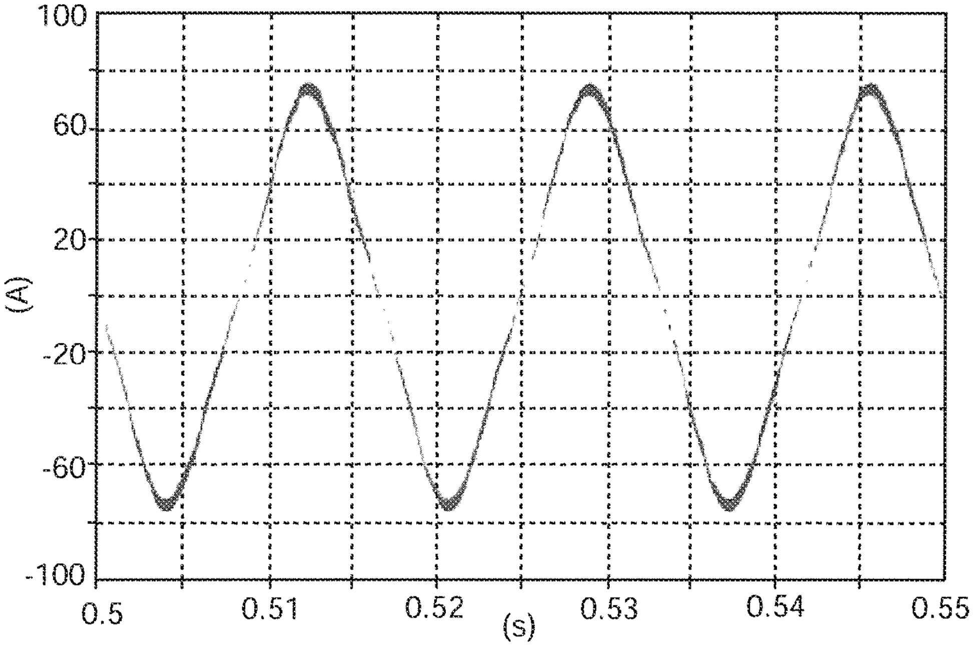
FIG. 14 is a graphical depiction of AC current without the notch filter of FIG. 9.

As shown in FIG. 14, the AC current has a considerable third-order harmonic component due in large part to this effect.

The notch filter, N(s), given in equation (35) has the opposite effect on the resonant controller, which blocks the 120 Hz component in the voltage loop. Then, the current loop can benefit from implementing this filter by reducing the 120 Hz component from $V_c$.

$$N(s) = \frac{\left(\frac{s}{2\omega_o}\right)^2 + 1}{\left(\frac{s}{2\omega_o}\right)^2 + s\frac{1}{2\omega_o Q_o} + 1} \tag{35}$$

Figure 15:
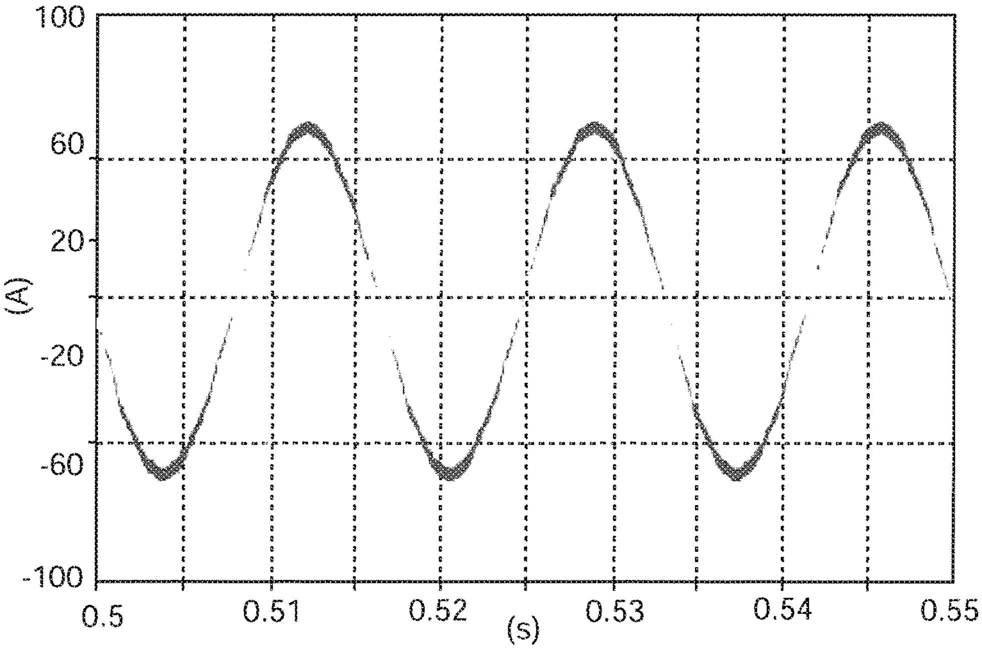
FIG. 15 is a graphical depiction of AC current with the notch filter of FIG. 9.

In FIG. 15, the AC current presents almost the ideal case when the notch filter is included. Low THD of the AC current regulation can be readily attained.

The DC link voltage decoupling terms, $1/V_{dc}$, are applied, as depicted in FIG. 9 in both current loops of the controller to reduce the loop-gain variation due to the DC link voltage in equations (26) and (32).

Figure 16:
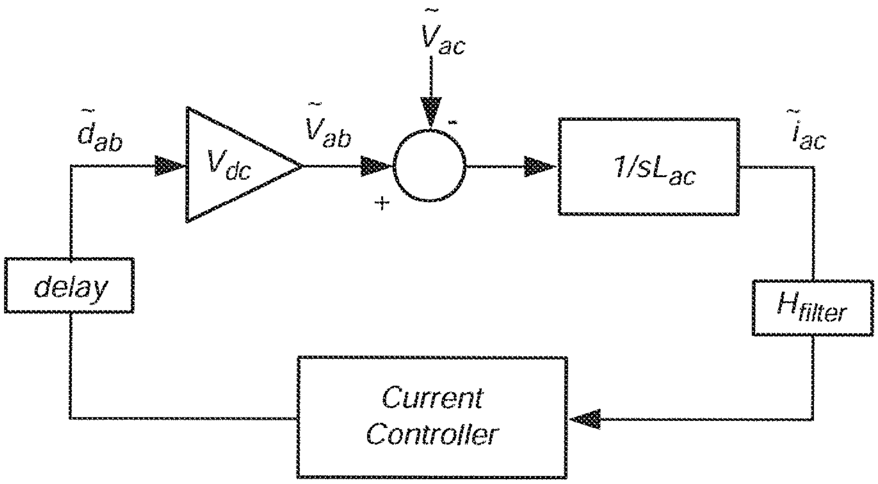
FIG. 16 is a simplified depiction of the current loop of the schematic diagram of FIG. 9.
Figure 17:
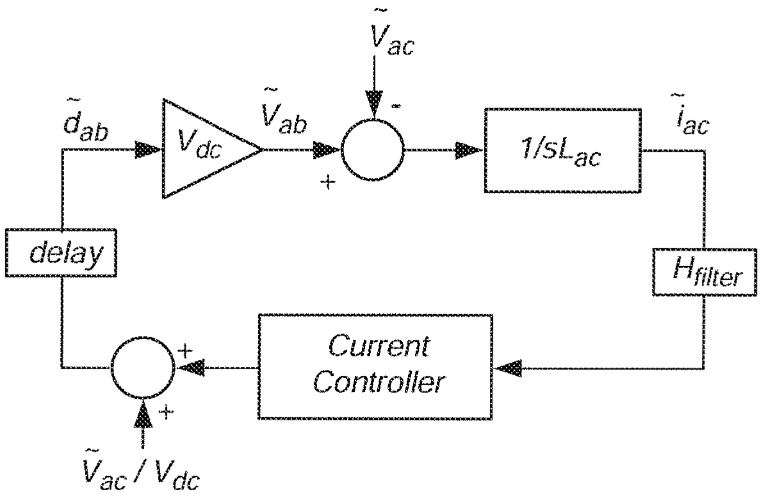
FIG. 17 is a simplified depiction of the current loop of the schematic diagram of FIG. 9 including disturbance rejection.

The perturbation of the AC grid should be also considered, especially in weak grid (e.g. when the grid impedance is not small) applications when the dynamics of the grid cannot be ignored. Based on equation (28), as shown in FIG. 16, an additional small-signal perturbation from the AC grid, $v_{ac}$, is added into the current loop. Voltage $v_{ab}$ is the full-bridge terminal voltage, which can be also found in FIG. 9. The perturbation can thus be canceled by the disturbance rejection term ($v_{ac}/v_{dc}$) in the controller as shown in FIG. 17. The droop resistor term, $R_{droop}$ is added in the second stage converter voltage loop in order to achieve the DC system droop control with other DC side renewable energy sources. All the aforementioned small-signal transfer functions are used to design the multi-pole/zero linear controllers with the desired control bandwidth and phase/gain margins. All the designed controllers then will be transferred to the discrete form via continuous to discrete transformation, such as the Tustin transformation. The transfer functions are preferably embodied as special purpose digital processors specific to the respective transfer function calculations which can be constructed as application specific integrated circuits (ASICs) for which numerous suitable design and fabrication techniques are known in the art to accommodate any desired calculation.

The total volume comparison is evaluated by considering all the parameters. Specifically, the design of dc inductor $L_o$ and capacitor $C_o$ are based on the current ripple $\Delta i_o$ and capacitor voltage ripple $\Delta v_o$, as shown below in equations (36) and (37):

$$L_o = \frac{1}{f_s}\frac{(1-d)V_o}{2\Delta i_o} = \frac{1}{2\Delta i_o f_s}\left(V_o - \frac{V_o^2}{V_{dc}}\right) \tag{36}$$

$$C_o = \frac{1}{f_s}\frac{\Delta i_o}{8\Delta v_o} \tag{37}$$

The first stage AC side inductor $L_{ac}$ is designed in accordance with equation (38) based on the ripple current requirement (<20%). The $2^{nd}$ stage AC side inductor $L_{ac2}$ is designed in accordance with equation (39) to meet the current harmonics requirement as specified in standard IEEE 1547. $V_{DM}$ is the spectrum of the terminal voltage of full-bridge. The design of the AC DM capacitor, $C_{DM}$, should preferably be in accordance with equation (40) to limit the reactive power level to less than 2.5%.

$$\frac{\sqrt{2}\,V_{dc}}{16 f_s L_{ac}} = \Delta i_{pp\_max} < 25\% \frac{P_{av}}{V_{ac\_rms}} \tag{38}$$

$$\frac{-V_{DM}(\omega)}{\sqrt{2}\,\omega(-\omega^2 L_{ac} L_{ac2} C_{DM} + L_{ac} + L_{ac2})} = I_G(\omega) \tag{39}$$

$$C_{DM} < 2.5\% \frac{P_{rate}}{2\pi f_o V_G^2} \tag{40}$$

The final designs and volume of the AC, DC passive and active components are shown in FIG. 18 under conditions of 20 KHz switching frequency. The DC link capacitor volume is based on the commercial availability of a film-type DC link capacitor (450 V rating for $C_o$, 800 V rating for $C_{dc}$). The inductor volume is obtained by choosing an amorphous alloy core due to the high saturation flux density. The results show that the two-stage topology with DC link capacitor reduction in accordance with the invention is deemed advantageous over the traditional full-bridge topology in terms of power density. In this regard, it should also be noted that a preferred commercially available component suitable and preferred for practice of the invention is a three phase IGBT power module including three series connected pairs of IGBTs corresponding to three phase legs of a power control circuit. Such a commercially available package allows two of the phase legs to be connected to form the H-bridge and the remaining phase leg to be connected to provide the switching of the second stage of the converter in accordance with the invention. The reduction in converter volume achieved in accordance with the invention is by approximately a factor of six.

A prototype meeting the size specifications of FIG. 18 has been built and satisfactorily tested using the test arrangement illustrated in FIG. 19, including a 25 KVA split-phase transformer. Power was transferred in either direction based on the relative magnitudes of the loads (load 1 and load 2) of the AC and DC sides of the converter.

Figure 20:
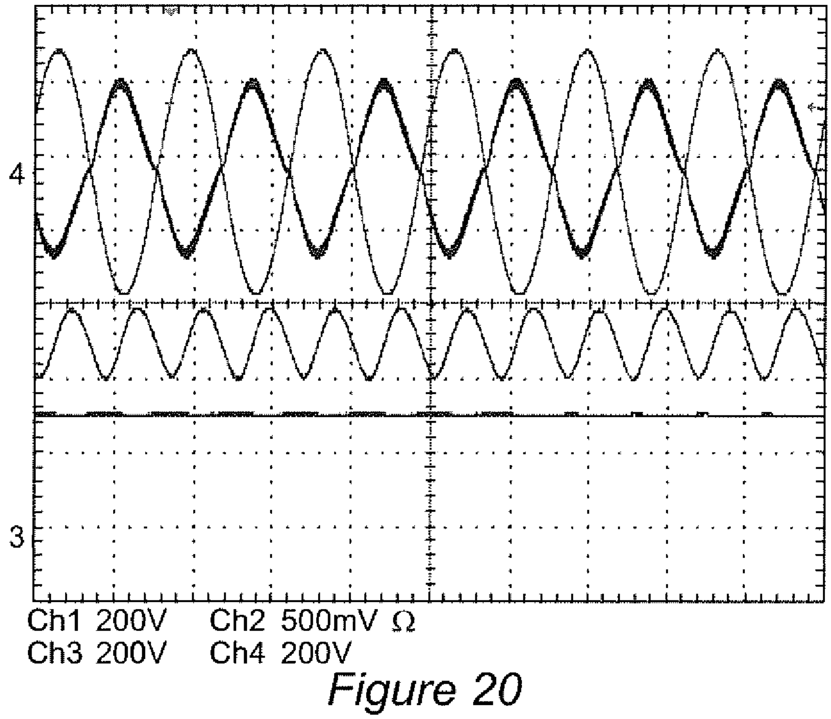
FIGS. 20, 21, 22 and 23 are graphical depictions of test results verifying operability of the invention.
Figure 21:
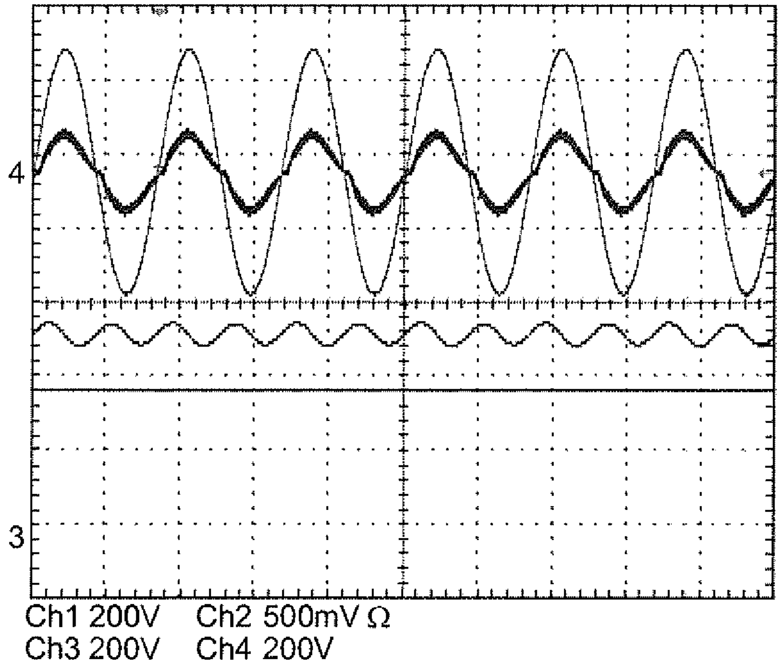
Figure 22:
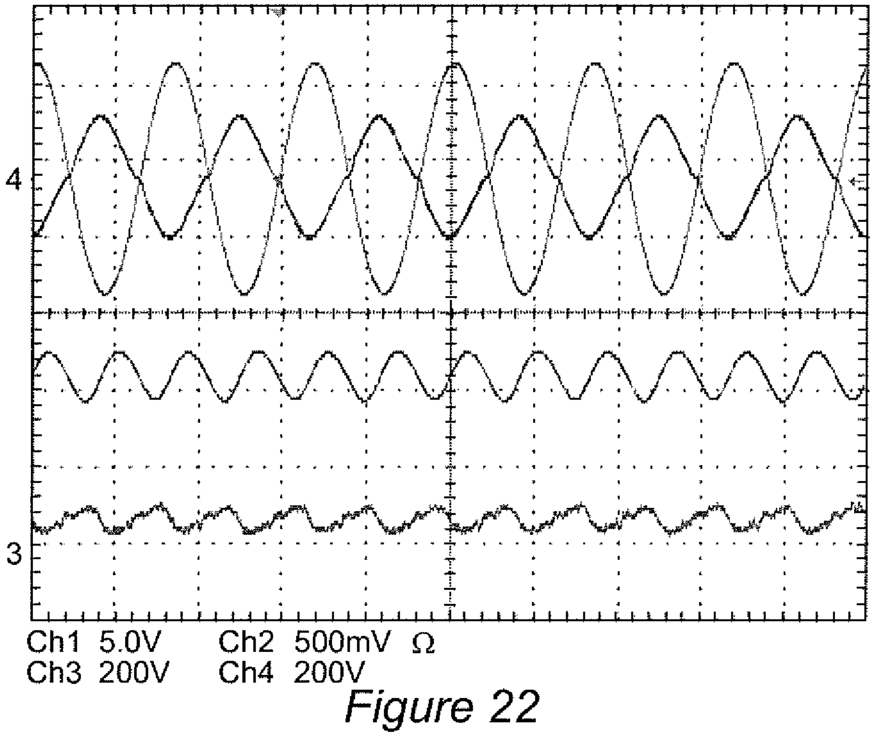
Figure 23:
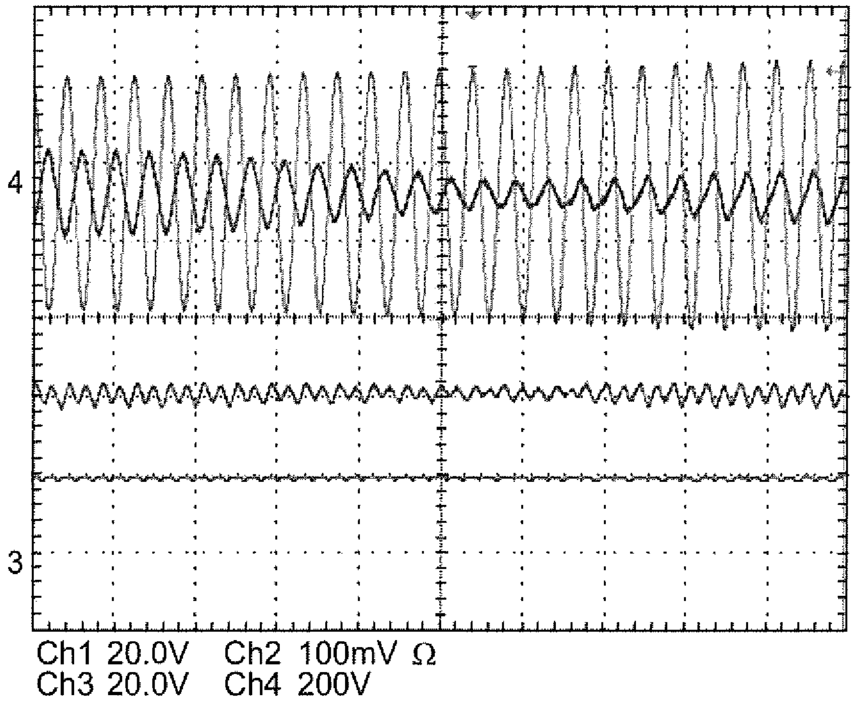

Bi-directional power tests under rectifier mode (ac to dc) and regenerative mode (DC to AC) are shown in FIGS. 20 and 21, respectively. FIG. 22 shows the ripple comparison of the DC link and the output of the second stage under 7 KW conditions. (Due to the small link capacitance, about 120 volts of ripple can be observed on the DC link while the final DC output voltage ripple can be held to about 2 volts.) For regenerative mode test, 1.5 kW loads are on dc side, while the 4.4 kW power is dispatched to the grid. FIG. 21 shows the results under 5 kW that the advanced control regulates the DC nanogrid bus $V_o$ at 380 V with a small voltage ripple even though the ripple of DC link voltage $V_{dc}$ is relatively large due to the reduction of the DC link capacitor $C_{dc}$. The seamless transition from the rectifier mode to the regenerative mode is shown in FIG. 23. This shows that the energy flows freely in either direction between the AC and DC sides of the converter without affecting the DC bus voltage $V_o$.

In view of the foregoing, it is seen that the provision of a voltage regulator as a second stage of a single phase bi-directional AC/DC power converter can be achieved consistent with bi-directional power transfer and allows a substantial reduction in converter size with potentially significant improvements in reliability and safety. The inclusion of a bi-directional second converter stage also provides for current limiting protection against shorting of the DC side of the converter. A consistent PWM control technique accommodates power transfer in either direction through the converter in a load-dependent fashion; providing a seamless change in power transfer direction. Rapid regulation response during load transients is also provided that is not limited by the small size or value of the DC link capacitor. A commercially available three-phase IGBT power module can be used to provide both the H-bridge and second stage regulator/converter switching to reduce cost of the power converter in accordance with the invention. the converter in accordance with the invention can be used singly or a plurality of converters in accordance with the invention may be used in respective phase-legs of a multi-phase power distribution system. The power transfer capability is highly appropriate to applications for generation of power from so-called renewable resources and/or DC nanogrids.

While the invention has been described in terms of a single preferred embodiment, those skilled in the art will recognize that the invention can be practiced with modification within the spirit and scope of the appended claims.

We claim:

1. A single-phase bi-directional AC/DC power converter having a DC side and an AC side for interfacing between a DC power distribution network to which DC loads and/or DC power sources are connected and an AC power distribution grid operating at a line frequency, comprising a full-bridge switching circuit connected between an AC source or load and a DC link, a DC link capacitor, and a bi-directional synchronous rectifier (SR) DC/DC power converter in series with said full bridge switching circuit and receiving power from or delivering power to said DC link and capable of providing DC voltage regulation in one direction of power transfer and an increased DC voltage in another direction of power transfer, and a DC side control loop in said DC side of said power converter for controlling duty cycle of switches of said bi-directional SR DC/DC converter whereby capacitance of said DC link capacitor can be reduced while limiting voltage variation at an output of said DC/DC power converter, said DC side control loop having a transfer function that has relatively increased gain at twice the AC line frequency to limit DC side voltage variation at a frequency which is twice said line frequency.

2. The power converter as recited in claim 1, wherein said bi-directional synchronous rectifier DC/DC power converter operates as a buck converter when transferring power from said full-bridge switching circuit to said DC side and operates as a boost converter when transferring power from said DC side to said full-bridge switching circuit.

3. The power converter as recited in claim 2, wherein said bi-directional synchronous rectifier DC/DC converter comprises an inductor in series with a DC input/output terminal and a filter capacitor.

4. The power converter as recited in claim 1, wherein said power converter further includes a filter on said AC side including a split inductor and a differential mode noise bypass capacitor.

5. The power converter as recited in claim 1, wherein said control loop includes resonant transfer function and a transfer function common to both buck and boost modes of operation connected in parallel with said resonant transfer function and an adder for combining outputs of said resonant transfer function and said transfer function common to both buck and boost modes of operation.

6. The power converter as recited in claim 5 wherein said resonant transfer function increases control loop gain at a frequency which is twice the AC line frequency.

7. The power converter as recited in claim 6 wherein said frequency which is twice the AC line frequency is 120 Hz.

8. The power converter as recited in claim 1 further including an AC side control loop in said AC side of said power converter for controlling duty cycle of switches of said full-bridge.

9. The power converter as recited in claim 8 wherein said AC side control loop includes a notch filter.

10. The power converter as recited in claim 1, wherein switches of said full bridge switching circuit and switches of said bi-directional synchronous rectifier DC/DC power converter are provided in a three-phase IGBT power module.

11. A single-phase bi-directional AC/DC power converter having a DC side and an AC side, comprising a full-bridge switching circuit connected between an AC source or load and a DC link, a DC link capacitor, and a bi-directional synchronous rectifier (SR) DC/DC Power converter in series with said full bridge switching circuit and receiving power from or delivering power to said DC link and capable of providing DC voltage regulation in one direction of power transfer and an increased DC voltage in another direction of power transfer, a DC side control loop in said DC side of said power converter for controlling duty cycle of switches of said bi-directional SR DC/DC converter, and a control circuit to balance power between said full bridge switching circuit and said bi-directional synchronous rectifier DC/DC power converter whereby capacitance of said DC link capacitor can be reduced while limiting voltage variation at an output of said DC/DC power converter and wherein said control circuit for balancing power is modeled as a transfer function from control duty cycle to output AC current and a transfer function from DC link voltage to output AC current.

12. The power converter as recited in claim 11 wherein said control signal to balance power provides a signal equal to a DC link voltage reference divided by the grid voltage RMS value as a gain/multiplier for a signal representing output current.

* * * * *